US010845107B2

(12) United States Patent
Zhang

(10) Patent No.: US 10,845,107 B2
(45) Date of Patent: Nov. 24, 2020

(54) VARIABLE SPEED COMPRESSOR BASED AC SYSTEM AND CONTROL METHOD

(71) Applicant: ECOER INC., McLean, VA (US)

(72) Inventor: Jianliang Zhang, Beijing (CN)

(*) Notice: Subject to any disclaimer, the term of this patent is extended or adjusted under 35 U.S.C. 154(b) by 0 days.

(21) Appl. No.: 16/344,008

(22) PCT Filed: Oct. 25, 2016

(86) PCT No.: PCT/US2016/586500
§ 371 (c)(1),
(2) Date: Apr. 22, 2019

(87) PCT Pub. No.: WO2018/080446
PCT Pub. Date: May 3, 2018

(65) Prior Publication Data
US 2019/0331379 A1    Oct. 31, 2019

(51) Int. Cl.
F25B 49/02 (2006.01)
F24F 11/62 (2018.01)

(52) U.S. Cl.
CPC ............. F25B 49/022 (2013.01); F24F 11/62 (2018.01); F25B 2600/01 (2013.01); F25B 2600/025 (2013.01); F25B 2600/0251 (2013.01); F25B 2600/0252 (2013.01); F25B 2600/0253 (2013.01); F25B 2700/15 (2013.01); F25B 2700/151 (2013.01)

(58) Field of Classification Search
CPC .. F25B 49/02; F25B 49/022; F25B 2600/025; F25B 2600/0251; F25B 2600/0252; F25B 2600/0253; F25B 2700/15; F25B 2700/151; F25B 2600/01; F24F 11/62
See application file for complete search history.

(56) References Cited

U.S. PATENT DOCUMENTS

| | | | |
|---|---|---|---|
| 2002/0134094 A1* | 9/2002 | Huh | F25B 49/022 62/175 |
| 2005/0102016 A1 | 1/2005 | Ahmed | |
| 2007/0199338 A1 | 8/2007 | Evans | |
| 2007/0227168 A1 | 10/2007 | Simmons | |
| 2010/0101248 A1* | 4/2010 | Lifson | F25B 49/02 62/115 |
| 2010/0263393 A1* | 10/2010 | Chen | F25B 1/10 62/115 |
| 2013/0025304 A1* | 1/2013 | Dorman | F25B 41/043 62/115 |
| 2013/0125572 A1 | 5/2013 | Childs et al. | |
| 2015/0121925 A1* | 5/2015 | Park | F25B 49/022 62/151 |
| 2016/0178223 A1* | 6/2016 | James | F24F 11/74 165/250 |
| 2016/0218624 A1 | 7/2016 | Daikin | |

* cited by examiner

Primary Examiner — David J Teitelbaum
(74) Attorney, Agent, or Firm — John Ye

(57) ABSTRACT

The present disclosure relates to the field of air conditioning technology. In particular, it involves a control method and control system based on a variable speed AC compressor.

20 Claims, 8 Drawing Sheets

VARIABLE SPEED COMPRESSOR BASED AC SYSTEM AND CONTROL METHOD

BACKGROUND OF THE DISCLOSURE

The present application is a national stage of PCT/US16/58650, filed on Oct. 25, 2016, with its specification incorporated by reference, but otherwise the same. The disclosure below will assume common knowledge of air conditioning and heat pump as well as their heat exchange principle in terms of achieving cooling and heating. Therefore, when discussing particular AC inner working, it is applied to heat pump collectively. The discussion will also treat compressor speed and compressor RPS (rotation per second) interchangeably as well.

With the development of air-conditioning technology, variable speed air conditioner is becoming mainstream product because it is energy efficient, low noise and good thermostatic, etc. Conventional variable speed air conditioner generally includes an indoor unit, an outdoor unit and a thermostat. When working normally, the variable speed outdoor unit receives the required switch signal from the indoor unit or the thermostat. Also received are set temperature, indoor temperature and other signals. The system generally uses the indoor vs. outdoor temperature difference, and the rate of change of this difference to determine the indoor cooling load. Based on the load requirement, it calculates the needed speed of the compressor. From this simple construction, we can see that unless there is constant multi-parameter communication with the indoor unit or thermostat, the conventional variable speed air conditioner is unable to obtain an accurate speed for the outdoor unit to match the load.

On the other hand, because existing fixed-speed AC unit has only one on/off switch communication between the outdoor unit and the indoor unit or the thermostat, in order to upgrade the existing fixed-speed AC unit to a variable speed unit, it means not only the variable speed compressor needs to be new, but also the indoor unit or thermostat will need to be compatible and new. Therefore, upgrading everything becomes the reason for increased costs and difficulty in installation.

SUMMARY OF THE DISCLOSURE

Based on the above deficiencies, an objective of the disclosure is to provide a new control system and method implementation, so that this new implementation will solve the deficiencies in upgrading to a variable speed AC system. The reinvented part of the system implementation is by self-learning the indoor load, in order to achieve precise output matching control on the variable speed AC system. This would be done all without the need to obtain the room temperature and the set temperature, which is fully compatible with the existing fixed speed AC control system. It is fulling compatible because under the existing on and off signaling mechanism, the outdoor variable speed AC compressor can still provide accurate speed adjustment.

To achieve the above objective in matching the variable speed compressor AC unit with the load, a control system of the present disclosure can be used. It is comprised of: a speed control calculation unit, a data storage unit, and an information acquisition unit.

As the speed control calculation unit, it is for calculating different load coefficient n and system cooling/heating capacity q based on the outdoor temperatures, as well as calculating projected total load N and total cooling/heating capacity Q. By comparing relationship between total load N and total output capacity Q, operating speed of the compressor is generated.

As the data storage unit, it is for storing data used by the speed control calculation unit, including lookup table n-Ta for the load coefficient values with their corresponding outdoor temperatures for the time required between the on and off signals.

As the information acquisition unit, it is for collecting sensor data generated by the outdoor unit, including the outdoor temperature, outdoor unit liquid outlet temperature, compressor return inlet temperature, compressor high pressure and compressor low pressure.

To achieve the aforementioned load matching, a new speed control method in the present disclosure comprises:
a. setting the time t from compressor starting until stopping;
b. from the lookup table n-Ta corresponding the outdoor temperatures, calculating total the indoor cool/heating load N;
c. based on the compressor output model calculating the cooling/heating capacity q, further calculating the total capacity Q between the time compressor starting until stopping;
d. comparing the total load N and total capacity Q—if N>Q then that means the output capacity is low, and it needs to increase the speed of the compressor—but if N<Q then that means the output capacity is high, and it needs to reduce the speed of the compressor—if Q=N, then the current compressor speed should be maintained;
e. running one timing cycle, returning to step d.

FIG. 1 shows an AC compressor operation cycle in this disclosure, defining $T_{on}$ as the room temperature at the time of the on signal is given by the indoor unit or the thermostat. Also defined is $T_{off}$, which is the room temperature at the time of the off signal given by the indoor unit or the thermostat. Continuing on, to is defined as the time when the prior AC compressor off signal is given, $t_1$ is defined as the time when this cycle's AC compressor on signal will be given and $t_2$ is defined as the time when this cycle's AC compressor off signal will be given. Therefore, from $t_0$ to $t_2$ is the interval of the AC compressor operating cycle. In addition, $T_a$ is defined as the average outdoor temperature for the time period between $t_1$ to $t_2$.

FIG. 2 shows a diagram of the disclosed AC system, including AC compressor sensors control unit, where G is defined as the system refrigerant circulation flow rate (in kg/s). This flow rate data is obtained from this compressor regression model:

$$G=f(PL,PH,Ts,RPS).$$

wherein, PL is AC compressor low pressure obtained by low-pressure sensor, and PH is AC compressor high pressure obtained by high-pressure sensor, Ts is return air temperature sensor value obtained, RPS for the AC compressor speed. These parameter data are real time data from operation, so their values can be corresponding to function of t. Therefore, the circulating refrigerant flow of G can also be obtained in real time by calculation.

From cooling thermodynamic, $H_{out}$ is defined as fluid outlet enthalpy, where its value can be obtained from the refrigerant's properties table:

$$H_{out}=f(PH,T_{out}).$$

This is possible because temperature can be obtained from fluid outlet temperature sensor, and the PH value can be obtained from the high pressure sensor.

Similarly, $H_{in}$ is defined as fluid inlet enthalpy, where its value can be obtained from the refrigerant's properties table:

$$H_{in}=f(PL,Ts).$$

This is also possible because temperature can be obtained from fluid inlet temperature sensor, and the PL value can be obtained from the low pressure sensor.

The system cooling capacity q can be expressed as a function of:

$$q=G\times(H_{out}-H_{in}).$$

Correspondingly, in heating, $H_{dis}$ is defined as compressor discharge outlet enthalpy, where its value can be obtained from the refrigerant's properties table:

$$H_{dis}=f(PH,T_d).$$

Same as cooling, this is possible because $T_d$ can be obtained from compressor outlet temperature sensor, and the PH value can be obtained from the high pressure sensor. Therefore, in heating, heating capacity q can be expressed as a function of:

$$q=G\times(H_{dis}-H_{out}).$$

From the above, when q(t) is integrated from $t_1$ to $t_2$, that value will be the total cooling/heating output Q for the time interval:

$$\int_{t1}^{t2}q(t)dt.$$

Further, N is defined as total indoor load from the $t_0$ to $t_2$ time interval. Due to the fact that the cooling load increases when heat gain coefficient n increases, which corresponding outdoor temperature increases (or in the case of heating load increases when heat loss coefficient n increases, which corresponding outdoor temperature decreases), we can see that the indoor load coefficient n (heat gain/heat loss per unit of time) is a function of the outdoor air temperature, where:

$$n=f(T_a).$$

In the present disclosure, the functional relationship of n-$T_a$ values can be stored in numeric format within the lookup database.

Therefore, the total indoor load from $t_0$ to $t_2$ is N, where N is a formula of:

$\int_{t0}^{t2}$ n(t) dt, thereinafter, called Formula N.

From FIG. 1, when the compressor operating in one cycle, if the starting room temperature $T_{off}$ is the same as the ending room temperature $T_{off}$, then that means the total cooling/heating load from $t_0$ to $t_2$ is equal to total cooling/heating output from $t_1$ to $t_2$. Therefore, the indoor load coefficient can be observed from the output as:

$$n=\frac{\int_{t1}^{t2}q(t)dt}{t1+t2},$$

thereinafter, called Formula A.

From this relationship, every time when the AC system runs one interval from start to end under various outdoor temperatures, the indoor load coefficient can be observed and stored in the data storage unit. Therefore, by retrieving the corresponding indoor load coefficient n, one can get the total indoor load N from $t_0$ to $t_2$. Extending this $t_0$ to $t_2$ as an operating period of general AC consumption, the total load of N can be compared with the accumulated total output Q from $t_1$ to $t_2$. Therefore, the comparison can be used to adjust the variable speed AC system output. When Q>N, the compressor speed is reduced in order to reduce the output. When Q<N then the compressor speed is increased in order to increase the output. And when Q=N, the precise matching of compressor output and indoor load is achieved.

This disclosure provides two aspects of the technical implementation. First, from Formula A, is a calculation of the indoor load coefficient, based on the outdoor average temperate $T_a$, for the period of $t_0$ to $t_2$, and storing such n-$T_a$ values into lookup table. Therefore, with an accumulated lookup table based on self-learning, a new indoor load coefficient is obtained each time the AC system runs an interval. This makes it possible for a given outdoor temperature, an indoor load coefficient n can be filtered from the lookup table to match the heat gain/heat loss characteristics. The second aspect is estimating the AC output Q between $t_1$ to $t_2$ in real time.

It should be clarified that in filtering the right indoor load coefficient n, one should be cognizant that not all data points collected would correspond to a completed operation cycle. This is because it is possible for the user to stop the AC before it reaches the end. Therefore, data points from these instances would not give accurate relationship between n and average outdoor temperature $T_a$. Technical solution can be found either taking an average value from the multiple data points for a given temperature to account for the effect of such occurrences, or set a reliability threshold to filter out unreliable data points.

DETAILED DESCRIPTION OF THE DISCLOSURE

First Embodiment

Figure 1:
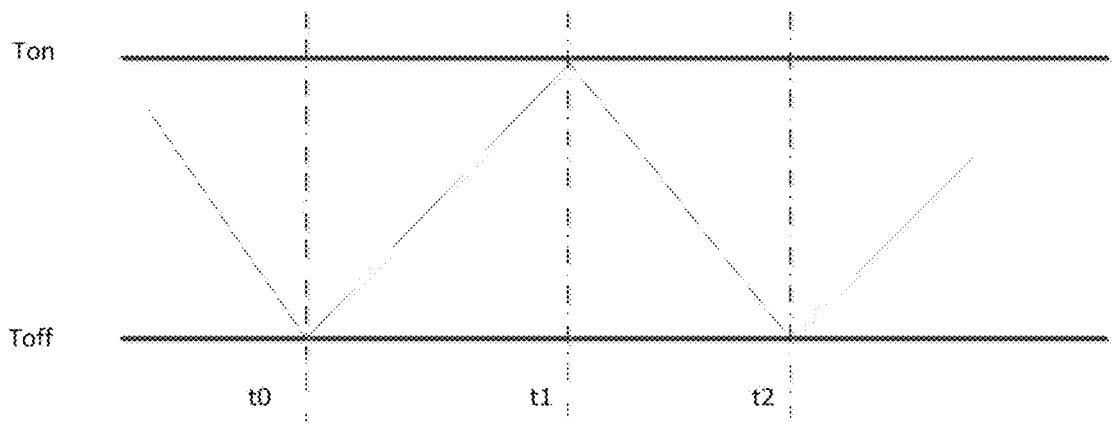
FIG. 1 shows an AC compressor operation cycle of this disclosure.
Figure 1:
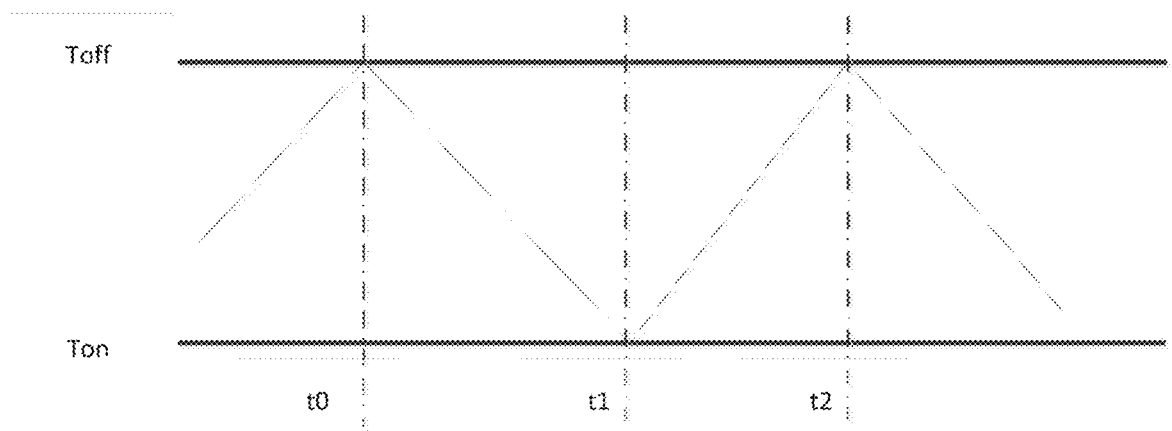
Figure 2:
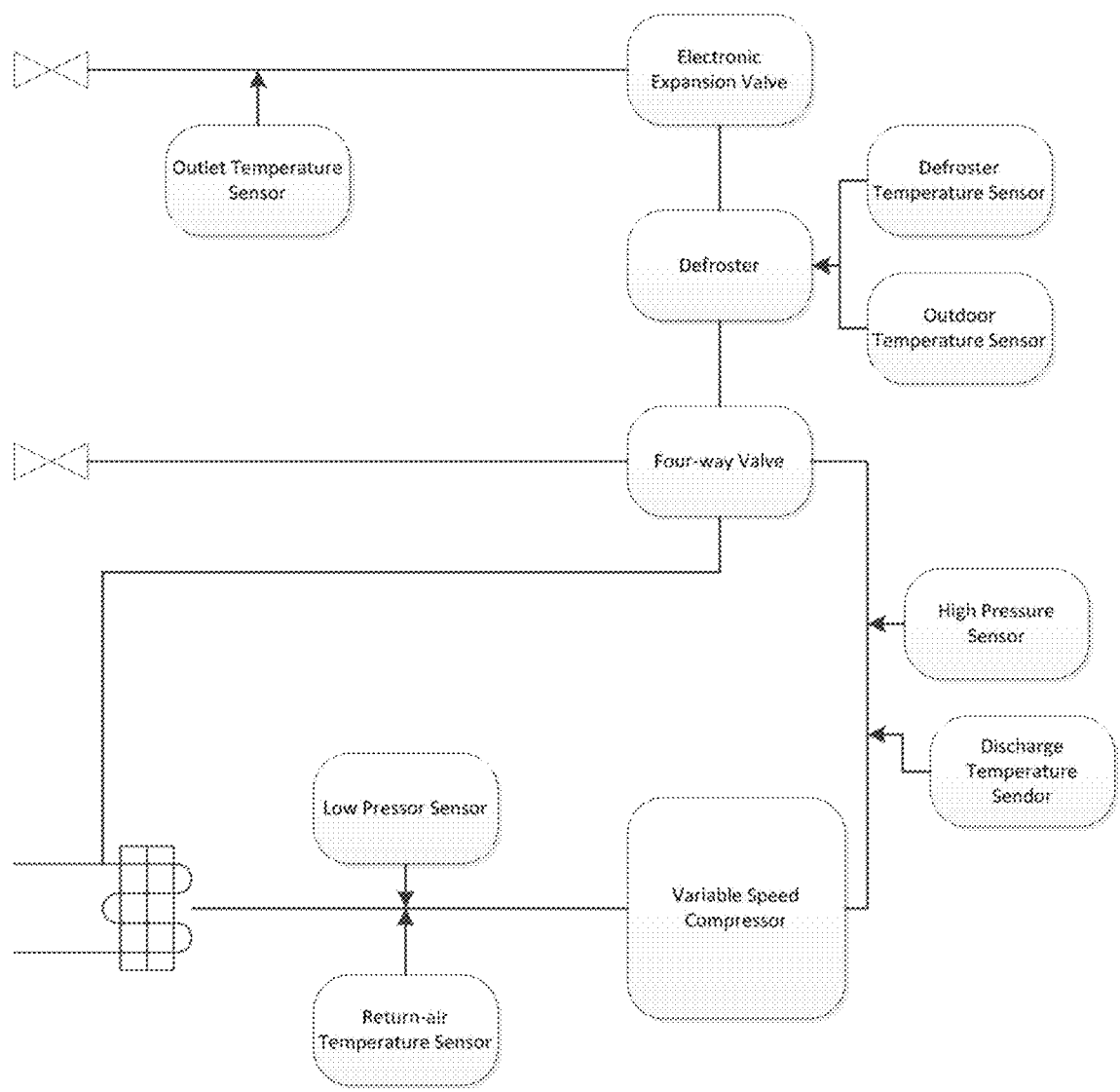
FIG. 2 shows a system diagram of the new variable AC unit implementation of this disclosure.
Figure 3:
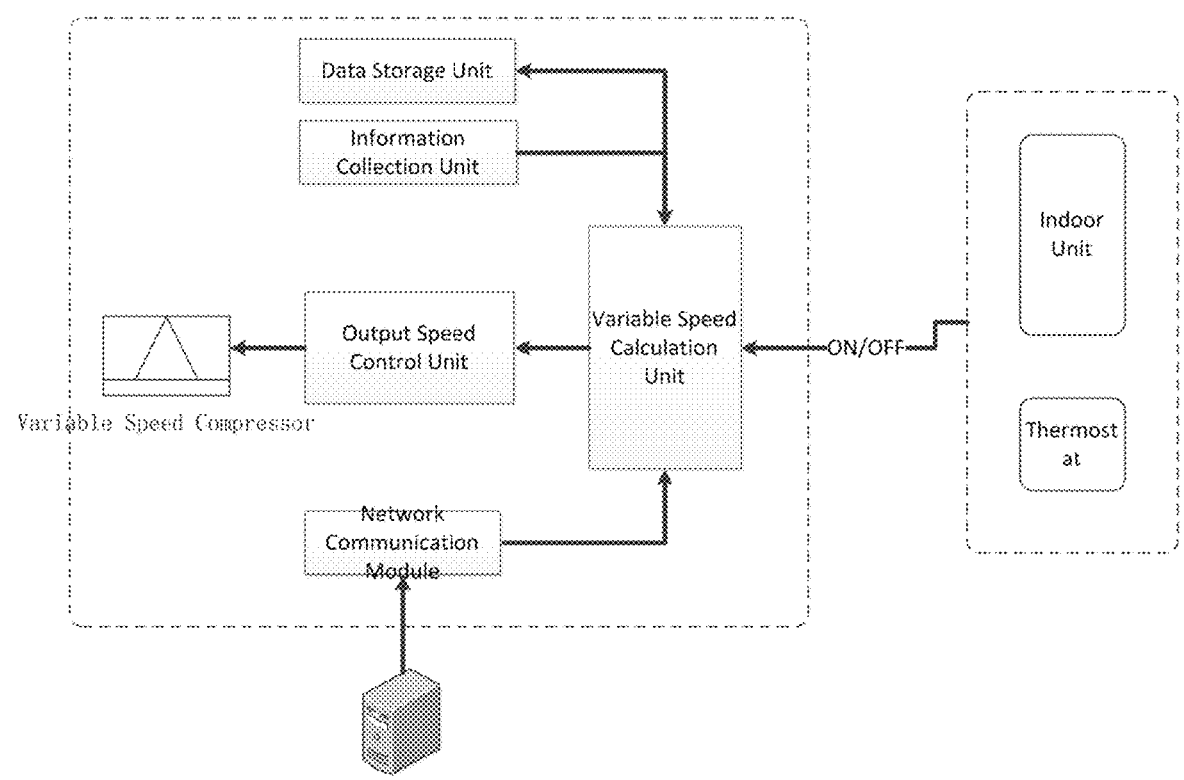
FIG. 3 shows configuration diagram how the new variable AC control unit fits into the overall AC system implementation.

FIG. 3 is the variable speed AC control system configuration diagram of the first embodiment, comprises: speed control calculation unit 10, database unit 20, operation data acquisition unit 30 and network communication module 40, wherein the speed control calculation unit 10 is for calculating the indoor load coefficient n, total indoor load N, system capacity q and total system output Q, and based on the comparing the total indoor load N and total cooling output Q, produce an optimal compressor speed value; and database unit 20, for storing and providing the indoor load coefficient n/outdoor temperature lookup data, as well as the compressor timing of the operating cycle, which are needed by the speed control calculation unit 10; and the operation data acquisition unit 30, for acquiring sensor data generated by the outdoor unit, including outdoor air temperature T, outdoor unit liquid outlet temperature $T_{out}$, compressor return inlet temperature $T_{in}$, compressor discharge temperature $T_{dis}$, the value of the compressor high pressure PH and the low pressure PL; and the network communication unit 40 is used to get weather forecasts results from a remote server, used to obtain in advance ambient temperature for the $t_0$ to $t_2$ period; and the speed control calculation unit 10 includes an indoor unit 110 to calculate the total load, and an output unit 120 for calculating total cooling/heating output capacity; and the indoor unit 110 for calculating the total load of N from the $t_0$ to $t_2$ period; and the output unit 120 for calculating total cooling/heating output capacity Q from the $t_1$ to $t_2$ period.

$t_1$ to $t_2$ Period Determination

The $t_1$ to $t_2$ period determination is based on goal setting. This is because if the period is set to shorter, it means greater the load, and greater the corresponding output. Negatively, the electrical consumption is also greater. Therefore, setting of $t_1$ to $t_2$ period can be set according to user's cooling/heating performance demand or energy-saving preference. But it can also be set by a remote server.

Total Indoor Load Calculation

Figure 4:
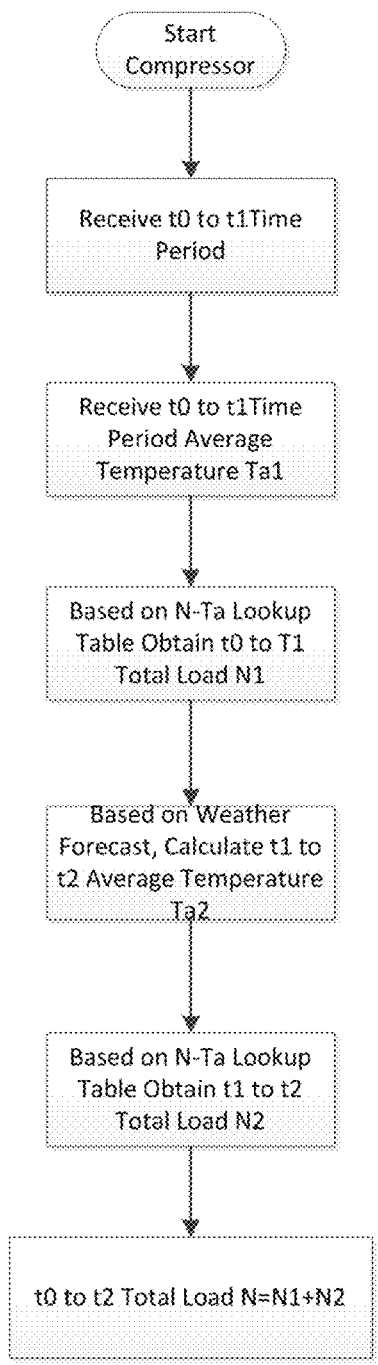
FIG. 4 shows a flowchart of a first embodiment of this disclosure, on how to get the total indoor load.

In this embodiment, the variable speed AC compressor control method uses the results of weather forecast to calculate the total indoor load N. The logic of this calculation depends on at least knowing the future $t_1$ to $t_2$ outdoor temperature change, before starting the AC compressor. As shown in FIG. 4, the steps for calculation of indoor total load are:

a. on AC compressor starting time $t_1$, retrieving the timing from the prior stopping time $t_0$ to the new starting time $t_1$;
b. calculating the average outdoor temperature of $t_0$ to $t_1$ as $T_{a1}$;
c. from the n-$T_a$ lookup table, determining the total indoor load of $N_1$ from $t_0$ to $t_1$;
d. from the weather forecast, receiving the outdoor temperature change information between $t_1$ to $t_2$ period;
e. calculating the average outdoor temperature;
f. from the n-$T_a$ lookup table, determine the total indoor load of $N_2$ from $t_1$ to $t_2$;
g. calculate the total indoor load of $N=N_1+N_2$ from $t_0$ to $t_2$;

Total Cooling/Heating Output Calculation

When AC compressor is operating between $t_1$ to $t_2$, and assuming the current time is t, then the total cooling/heating output of $Q_1$ from $t_1$ to t can be expressed as:

$$\int_{t1}^{t} q(t)dt.$$

Also assuming the output is constant as q(t) from t to $t_2$, then the total cooling/heating output of $Q_2$ from t to $t_2$ can be expressed as:

$$q(t) \times (t_2-t).$$

Therefore, the total cooling/heating output Q from $t_1$ to $t_2$ should be $Q=Q_1+Q_2$, which is:

$$\int_{t1}^{t} Q(t)dt + Q(t) \times (t_2-t).$$

AC Speed Control Method

Figure 5:
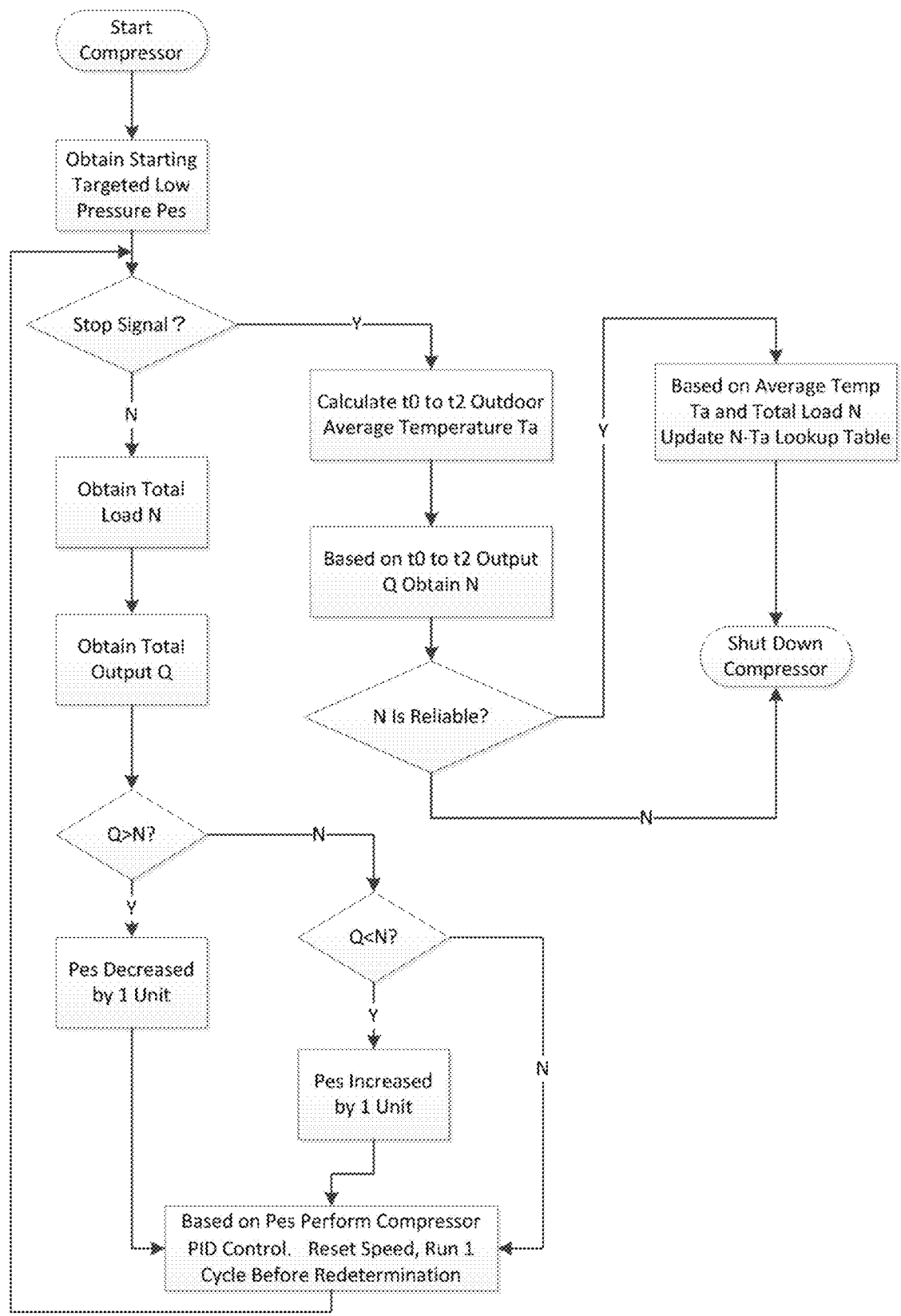
FIG. 5 shows the first embodiment of this disclosure, on how optimal speed is determined in the variable speed system.

As FIG. 5 shows, an AC speed control method in this embodiment can be said to be comprised of these steps:

a. receiving start signal for the AC compressor, then start the compressor;
b. obtaining a targeted starting low pressure of Pes (in cooling mode), or high pressure of Pcs (in heating mode);
c. determining whether stop signal for the AC compressor is received—if true, then go to step i—if not, then continue to step d;
d. obtaining total indoor cooling/heating load N during targeted period;
e. obtaining total compressor cooling/heating output Q for the targeted period;
f. determining whether the total indoor cooling/heating load N is greater than the total output—if yes, then lower the low pressure of Pes by one pressure unit in cooling mode, or increase the high pressure of Pcs in heating mode, and go to step h—if not, then go to step g;
g. determining whether the total indoor cooling/heating load N is less than the total output—if yes, then increase the low pressure of Pes by one pressure unit in cooling mode, or lower the high pressure of Pcs in heating mode—if not, then keep Pes or Pcs the same;
h. based on the Pes (in cooling mode), or the Pcs (in heating mode) value, performing compressor PID (proportional, integral, and derivative) control, adjusting the compressor operation speed, and running the compressor for one timing cycle before the next speed redetermination, and then return to step c;
i. calculating outdoor average temperature $T_a$ from $t_0$ to $t_2$ timing;
j. based on the $t_0$ to $t_2$ timing, and the total compressor output Q, obtaining the actual total indoor load coefficient n from the $t_0$ to $t_2$ timing;
k. determining whether the total indoor load coefficient n is within a reliable range—if yes, then update the n-$T_a$ lookup table before shutting down the compressor—if not, shut down the compressor without updating.

In the above-described control method, the targeted starting compressor speed in each cycle can be adjusted according to the actual working conditions. The cycle timing can be adjusted according to the actual working conditions as well.

Based on this embodiment, the beneficial effects of the present disclosure is that one can obtain precise speed control in the variable speed AC compressor, all under the same conventional switching scheme where only the on/off signals are sent to the outdoor unit by the indoor unit or the thermostat.

Second Embodiment

Figure 6:
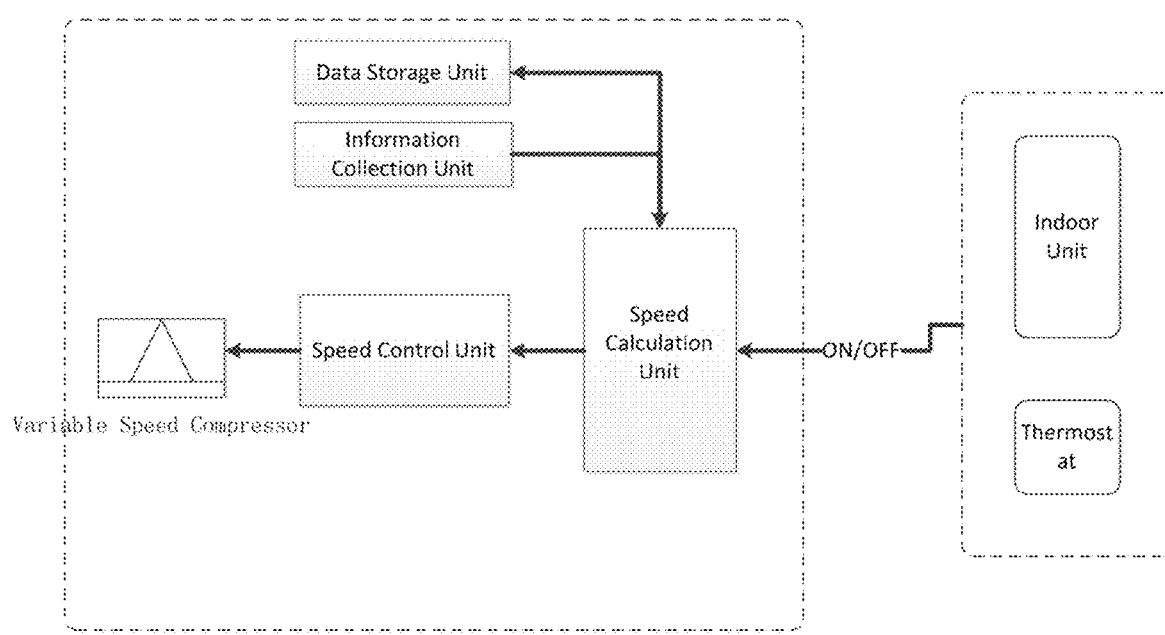
FIG. 6 shows a variable control unit diagram of a second embodiment of this disclosure.

FIG. 6 is the variable speed AC control system configuration diagram of the second embodiment, comprises: speed control calculation unit 101, database unit 201, and operation data acquisition unit 301 wherein the speed control calculation unit 101 is for calculating the indoor load coefficient n, total indoor load N, system capacity q and total system output Q, and based on the comparing the total indoor load N and total cooling output Q, producing an optimal compressor speed value; and database unit 201, for storing and providing the indoor load coefficient n/outdoor temperature lookup data, as well as the compressor timing of the operating cycle, which are needed by the speed control calculation unit 101; and the operation data acquisition unit 301, for acquiring sensor data generated by the outdoor unit, including outdoor air temperature T, outdoor unit liquid outlet temperature $T_{out}$, compressor return inlet temperature $T_{in}$, compressor discharge temperature $T_{dis}$, the value of the compressor high pressure PH and the low pressure PL; and the speed control calculation unit 101 includes an indoor unit 111 and an output unit 121; and the indoor unit 111 is for calculating the total load of N from the $t_0$ to $t_2$ period; and the output unit 121 is for calculating total cooling/heating output capacity Q from the $t_1$ to $t_2$ period.

$t_1$ to $t_2$ Period Determination

The $t_1$ to $t_2$ period determination is the same as that in Embodiment 1.

Total Indoor Load Calculation

Figure 7:
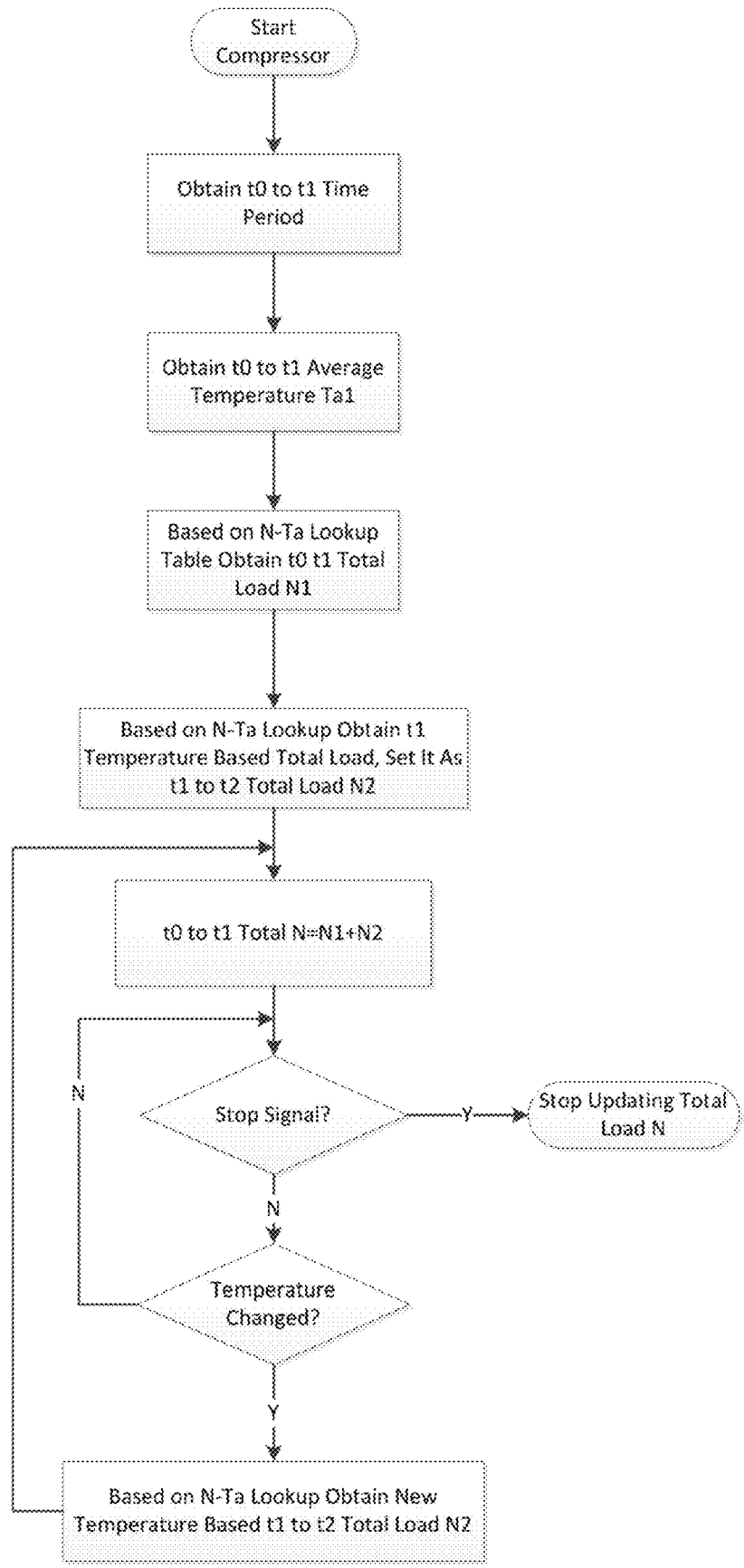
FIG. 7 shows a flowchart on how to observe the indoor load in the second embodiment of this disclosure.

In this embodiment, the variable speed AC compressor control method updates the load coefficient value from $t_0$ to $t_2$ based on varying outdoor temperatures. As compared to Embodiment 1, it does not rely on the weather forecast. Therefore, it does not need a network communication module. Moreover, the calculated indoor load under such method can change according to the changing temperatures. As shown in FIG. 7, the steps for calculation of indoor total load are:
a. on AC compressor starting time $t_1$, retrieving from the prior stopping time $t_0$ to the new starting time $t_1$, timing information on various outdoor temperatures, as well as the load coefficient n under the various outdoor temperatures;
b. calculating the total indoor load $N_1$ from $t_0$ to $t_1$ by adding up the load calculations from the various temperature and timing;
c. determining the total indoor load of $N_2$ from $t_1$ to $t_2$ by taking period load coefficient based on temperature at $t_1$ from the n-$T_a$ lookup table;
d. calculating the total indoor load of $N=N_1+N_2$ from $t_0$ to $t_2$;
e. determining whether the stop signal is received—if not, then go to step f—if yes, then stop;
f. determining whether the outdoor temperature has changed—if not, go back to step e—if yes, then go to step g;
g. assuming the load coefficient $n(T_x)$ at $t_x$ when the temperature is changed is different from the prior $n(T_a)$, using $n(T_x)$ for calculating the total load for the rest of period from $t_x$ to $t_2$, and updating the resulting new $N_2$ before returning to step d.

Total Cooling/Heating Output Calculation

The total indoor load calculation is the same as that in Embodiment 1.

AC Speed Control Method

Figure 8:
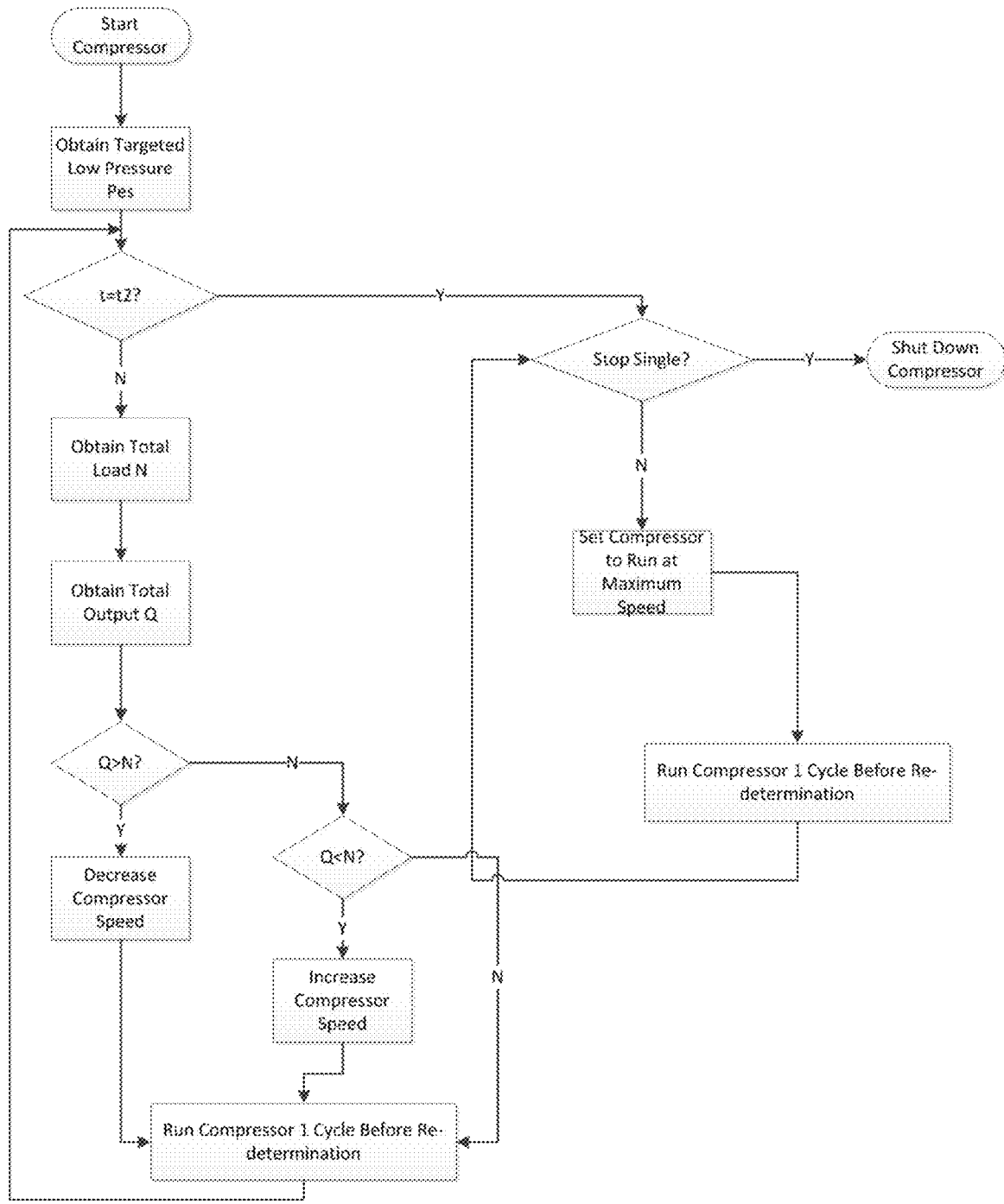
FIG. 8 shows a flowchart on when to maximize speed in the second embodiment of this disclosure.

As FIG. 8 shows, an AC speed control method in this embodiment can be said to be similar to that in Embodiment 1, except that there is an additional treatment when arriving at the targeted $t_2$ and the compressor still has not received a stop signal.

This enhanced method comprises:

a. receiving start signal for the AC compressor, start the compressor;
b. obtain a targeted starting compressor speed;
c. determining whether the time is $t_2$—if yes, go to step i—if not, go to step d;
d. obtaining total indoor cooling/heating load N during targeted period;
e. obtaining total compressor cooling/heating output Q for the targeted period;
f. determining whether the total indoor cooling/heating load N is greater than the total output—if yes, then increase the compressor speed—if not, then go to step g;
g. determining whether the total indoor cooling/heating load N is less than the total output Q—if yes, then lower the targeted compressor speed—if not, then keep the same compressor speed;
h. run the compressor for one timing cycle before the next speed redetermination, and then return to step c;
i. determining whether stop signal for the AC compressor is received—if true, then stop—if not, then continue to step j;
j. forcing the compressor output to the maximum;
k. run the compressor for one timing cycle before the next speed redetermination, and then return to step i.

The control method described above is improved upon that of Embodiment 1. Given that when the time $t_2$ arrives, if the compressor stop signal has not been received, that means the compressor output has not been high enough to satisfied the indoor temperature need. Therefore, the situation requires higher compressor output, in order to cool down and trigger the compressor stop signal as quickly as possible. This embodiment uses a maximum operation speed to increase the compressor output as the remedial approach, but to person ordinary skilled in the art, other remedial approaches are possible, such as increasing the speed steadily in each successive speed redetermination cycle.

Based on this embodiment, the beneficial effects of the present disclosure is that one can obtain precise speed control in the variable speed AC compressor, all under the same conventional switching scheme where only the on/off signals are sent to the outdoor unit by the indoor unit or the thermostat.

The invention claimed is:

1. A variable speed AC control system for cooling or heating comprises:
    speed control calculator and database unit,
    wherein the speed control calculator is configured for producing an optimal compressor speed value based on
        step 1, considering user's performance and energy saving preferences to determine a timing for a conventional off-on-off operation signaling and timing cycle and
        step 2, based on the timing in step 1 calculating indoor load in thermal units in the conventional off-on-off operation signaling and timing cycle; and
        step 3, matching the indoor load and an AC output in thermal units with the conventional off-on-off operation signaling and timing cycle, having one compressor speed for one given timing cycle so that the indoor load equals the AC output within the conventional off-on-off operation signaling and timing cycle determined in step 1.
2. The variable speed AC control system according to claim 1, wherein the database unit is configured for storing and providing indoor load coefficient and outdoor temperature lookup data, which are needed by the speed control calculator.

3. The variable speed AC control system according to claim 2, wherein the control system is configured for acquiring sensor data generated by outdoor unit, including outdoor aft temperature, outdoor unit liquid outlet temperature, compressor return inlet temperature, compressor discharge temperature, values of compressor high pressure and low pressure.

4. The variable speed AC control system according to claim 3, wherein the speed control calculator further comprises of indoor calculator for calculating the total load for the operation timing cycle; and output calculator for calculating the total output for the operation timing cycle.

5. The variable speed AC control system according to claim 4, wherein the speed control calculator calculates actual indoor load coefficient for actual operation timing cycle, where this actual bad coefficient, the corresponding actual operation timing cycle and actual average temperature would be used to update the lookup data.

6. The variable speed AC control system according to claim 5, wherein when the actual operation timing cycle is greater than a targeted operation timing, increases the output.

7. The variable speed AC control system according to claim 5, wherein the control system is configured to obtain in advance outdoor temperature values.

8. A variable speed AC control method for cooling or heating, comprising:
  producing an optimal compressor speed value based on
    step 1, considering user's performance and energy saving preferences to determine a timing for a conventional off-on-off operation signaling and timing cycle; and
    step 2, based on the timing in step 1 determining indoor bad in thermal in the conventional off-on-off operation signaling and timing cycle; and
    step 3, matching the indoor load and an AC output in thermal units with the conventional off-on-off operation signaling and timing cycle, having one compressor speed for one given timing cycle so that the indoor bad equals the AC output within the conventional off-on-off operation signaling and timing cycle determined in step 1.

9. The variable speed AC control method according to claim 8, further comprising:
  calculating total indoor load and total output for the given operation signaling and timing cycle; and
  resetting the AC compressor speed so that the total output matches the total indoor load.

10. The variable speed AC control method according to claim 9, wherein
  the calculation of total indoor load is based on retrieving from load coefficient/temperature lookup table values and adding up the off-on period total load and on-off period total load.

11. The variable speed AC control method according to claim 10, wherein
  the coefficient/temperature lookup data is from prior recorded output data, where such output data is calculated based on outdoor air temperature, outdoor unit liquid outlet temperature, compressor return inlet temperature, compressor discharge temperature, values of compressor high pressure and low pressure.

12. The variable speed AC control method according to claim 11, further comprising:
  re-determining periodically updated output value, comparing that with updated total load value, in order to reset the AC compressor speed so the total output matches the total load.

13. The variable speed AC control method according to claim 12, further comprising:
  responding when the off signal does not arrive at the end of the targeted operation timing cycle, by increasing the output in order to compensate a higher than expected load.

14. The variable speed AC control method according to claim 13, further comprising:
  re-determining the updated total load value based on actual outdoor temperatures at prior successive re-determining timing periods and based on projecting current temperature being constant until the end of the operating cycle.

15. The variable speed AC control method according to claim 14, further comprising:
  responding to possible inaccurate coefficient values when the end of operation off signal is given due to interruption, by utilizing data management method such as averaging or setting a confidence level.

16. A non-transitory computer-readable medium having stored thereon a set of computer-executable instructions for causing a first device to perform steps comprising:
  producing an optimal compressor speed value based on
    step 1, considering user's performance and energy saving preferences to determine a timing for a conventional off-on-off operation signaling and timing cycle; and
    step 2, based on the timing in step 1 determining indoor load in thermal units in the conventional off-on-off operation signaling and timing cycle; and
    step 3, matching the indoor load and an AC cycle, having one compressor speed for one given timing cycle so that the indoor load equals the AC output within the conventional off-on-off operation signaling and timing cycle determined in step 1.

17. The non-transitory computer-readable medium having stored thereon a set of computer-executable instructions for causing the first device to perform steps according to claim 16, further comprising:
  calculating total indoor load and total output for the given operation signaling and timing cycle; and
  resetting the AC compressor speed so that the total output matches the total indoor load.

18. The non-transitory computer-readable medium having stored thereon a set of computer-executable instructions for causing the first device to perform steps according to claim 17, wherein
  the calculation of total indoor load is based on retrieving from load coefficient/temperature lookup table values and adding up the off-on period total load and on-off period total load.

19. The non-transitory computer-readable medium having stored thereon a set of computer-executable instructions for causing the first device to perform steps according to claim 18, wherein
  the coefficient/temperature lookup data is from prior recorded output data, where such output data is calculated based on outdoor air temperature, outdoor unit liquid outlet temperature, compressor return inlet temperature, compressor discharge temperature, values of compressor high pressure and low pressure.

20. The non-transitory computer-readable medium having stored thereon a set of computer-executable instructions for causing the first device to perform steps according to claim 19, further comprising:

re-determining periodically updated output value, comparing that with updated total load value, in order to reset the AC compressor speed so the total output matches the total load.

* * * * *